(12) United States Patent
Turrina et al.

(10) Patent No.: US 9,566,628 B2
(45) Date of Patent: Feb. 14, 2017

(54) INTEGRAL WORKPIECE HAVING A DUCT, AND MANUFACTURING METHOD FOR SAME

(71) Applicant: HIRSCHVOGEL UMFORMTECHNIK GMBH, Denklingen (DE)

(72) Inventors: Rupert Turrina, Fuchstal (DE); Hans Britzger, Denklingen (DE)

(73) Assignee: Hirschvogel Umformtechnik GmbH, Denklingen (DE)

(*) Notice: Subject to any disclaimer, the term of this patent is extended or adjusted under 35 U.S.C. 154(b) by 502 days.

(21) Appl. No.: 14/072,954

(22) Filed: Nov. 6, 2013

(65) Prior Publication Data

US 2014/0178708 A1    Jun. 26, 2014

(30) Foreign Application Priority Data

Dec. 21, 2012   (DE) .................. 10 2012 224 253

(51) Int. Cl.

| B21D 19/00 | (2006.01) |
|---|---|
| B23P 15/00 | (2006.01) |
| B21K 21/12 | (2006.01) |
| B21K 23/04 | (2006.01) |
| B21K 25/00 | (2006.01) |

(52) U.S. Cl.
CPC ............... *B21D 19/00* (2013.01); *B21K 21/12* (2013.01); *B21K 23/04* (2013.01); *B21K 25/00* (2013.01); *B23P 15/00* (2013.01); *Y10T 428/12264* (2015.01)

(58) Field of Classification Search
CPC ......... B21D 19/00; B21K 21/12; B21K 23/04; B21K 25/00
See application file for complete search history.

(56) References Cited

U.S. PATENT DOCUMENTS

| 2,038,439 A * | 4/1936 | Moss ..................... B23K 5/006 219/137 R |
|---|---|---|
| 3,284,115 A * | 11/1966 | Schmidt .............. F16C 11/0628 277/635 |
| 6,575,684 B2 * | 6/2003 | Heinicke .............. B65D 17/165 413/56 |

* cited by examiner

Primary Examiner — Adam Krupicka
(74) Attorney, Agent, or Firm — Marshall, Gerstein & Borun LLP

(57) ABSTRACT

An integral workpiece which has a duct located within a region which extends, for example in an annular manner, and formed about an axis of the workpiece. The workpiece has a form-fitting connection by which, when viewed in a cross section extending through the axis, the duct is closed. The form-fitting connection enables, in comparison with known manufacturing methods, particularly simple manufacturing of the workpiece. In particular, no welding or screwing is required for closing the duct.

14 Claims, 2 Drawing Sheets

Fig. 1

INTEGRAL WORKPIECE HAVING A DUCT, AND MANUFACTURING METHOD FOR SAME

BACKGROUND OF THE INVENTION

Field of the Invention

The invention relates to an integral workpiece having a duct, which is located within a region which extends, for example in an annular manner, about an axis of the workpiece, wherein the duct is formed by forming. The invention further relates to a manufacturing method for such a workpiece.

Related Technology

Such a workpiece having a corresponding duct can be manufactured from steel or aluminum by casting, the duct being created by a lost core. In the case of a steel part, manufacturing may alternatively take place by forging, the duct being formed by hot metal spinning. These manufacturing methods are associated with significant cost. Manufacturing the duct by means of soldering, welding or adhesive bonding is also comparatively costly.

SUMMARY OF THE INVENTION

The invention is based on the object of providing a corresponding integral workpiece which can be particularly simply manufactured, and a method for manufacturing such a workpiece.

According to the invention, an integral workpiece is provided which has a duct which is located within a region which extends, for example in an annular manner, about an axis of the workpiece; the duct here is formed by forming. Furthermore, the workpiece has a form-fitting connection by which, when viewed in a cross section extending through the axis, the duct is closed.

The form-fitting connection enables—in comparison with the manufacturing methods known to date—particularly simple manufacturing of the workpiece. In particular, no welding or screwing is required for closing the duct.

Advantageously, the form-fitting connection comprises a groove and a latching element which engages in the groove. Since corresponding structures can be formed in a comparatively simple manner, this makes further simplified manufacturing of the workpiece possible.

Preferably, the groove and/or the latching element here is/are configured extending about the axis in an annular, preferably closed annular, manner. On account of this, the duct can be designed in a particularly secure and tight manner.

In a manner which is furthermore advantageous from a manufacturing point of view, the groove and/or the latching element here are pre-formed.

The duct may be configured extending about the axis in an annular, in particular closed annular, manner. Alternatively, the duct may be configured extending in a rectilineal manner.

Preferably, the duct is formed by cold forming, in particular by compressing.

Furthermore advantageously, the workpiece consists of steel. It may, however, also consist of aluminum.

According to a further aspect of the invention, a method for manufacturing an integral workpiece is provided, which workpiece has a duct which is located within a region which extends, for example in an annular manner, about an axis of the workpiece, wherein in one step the duct is formed by forming. Here, in the context of the formation of the duct, when viewed in a cross section extending through the axis, the duct is closed by a form-fitting connection.

Advantageously, the method moreover has the further steps: forming a groove and a latching element for the formation of the form-fitting connection, and establishing the form-fitting connection by latching the latching element in the groove.

The forming preferably comprises compressing or preferably takes place by compressing.

Advantageously in terms of energy and manufacturing, the forming is cold forming.

BRIEF DESCRIPTION OF THE DRAWINGS

The invention will be described in more detail in the following with reference to an exemplary embodiment and with reference to the drawings, in which:

FIG. 1 shows a sketch of a cross-sectional view of an exemplary embodiment of a workpiece according to the invention.

DETAILED DESCRIPTION

Figure 1:
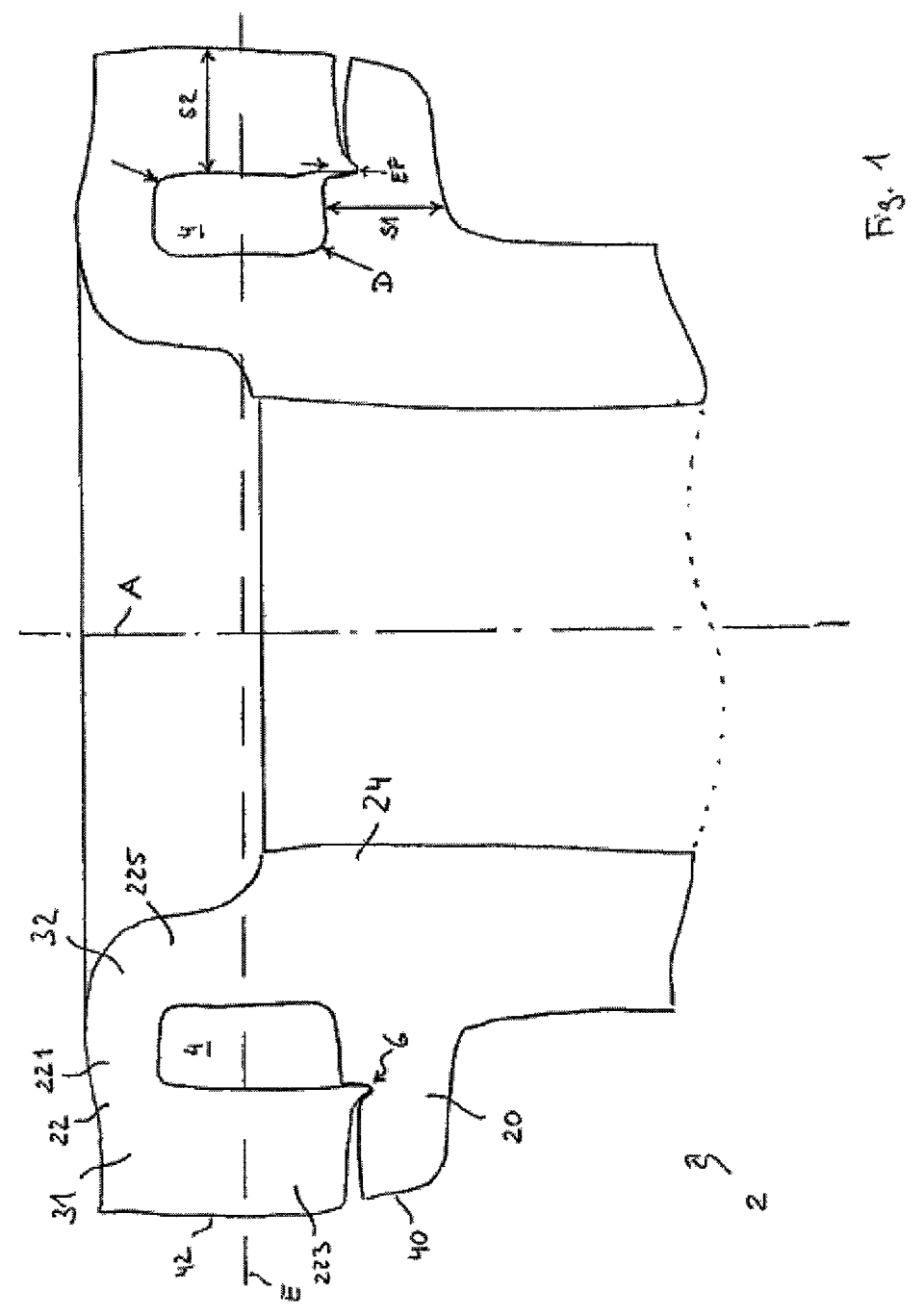
Figure 3:
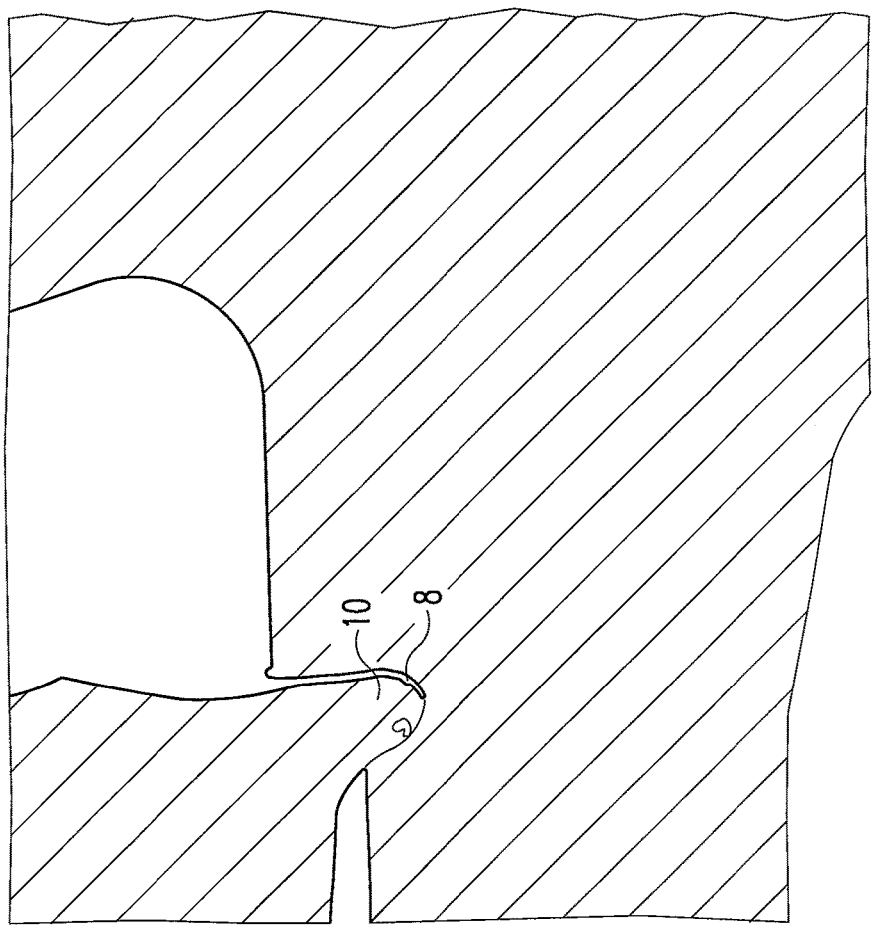
FIG. 3 shows an enlarged detail from FIG. 2 in the region of the form-fitting connection.

FIG. 1 shows a view in sketch form of a cross section of an exemplary embodiment of a workpiece 2 according to the invention. The workpiece 2 may be a tube element or an essentially cylindrical element, as outlined in FIG. 1. Here, the workpiece 2 with reference to the illustration of FIG. 1 may continue downward for any length. In somewhat more general terms, the invention is suited to a workpiece 2 which on an end region is correspondingly shaped in a tubular or cylindrical manner. The workpiece 2 here may in this end region be open on the inside—as shown in an exemplary manner in FIG. 1—or it may also be filled or closed.

The workpiece 2 has an integral configuration; that is to say that it is, in particular, not assembled from two or more individual parts, but consists of a single piece or part. The workpiece 2 is made from only one part. The workpiece may, in particular, be a steel part or also an aluminum part. Here, a steel part is, in principle, more stable than a corresponding aluminum part.

The workpiece 2 has a cavity or duct 4, which may be, for example, a duct for a cooling medium. The duct 4 is located within a region which extends, for example in an annular manner, about an axis A of the workpiece 2. The actual duct 4, however, does not have to be annular. The duct may, for example, also have a shape extending in a rectilineal manner.

The duct 4 may be configured extending in an annular manner. "Annular" in this context is to mean that the structure described in this manner defines an annular shape, not necessarily a circular annular shape, wherein the structure in general, however, does not have to form a continuous and self-contained annular shape, but it being also possible for an interruption to be provided or for a plurality of interruptions to be provided. The duct 4, therefore, does not necessarily have to be closed or integral.

The duct 4 may thus have, for example, two or more sections which are separated from one another and which—when viewed in combination—define an annular shape. However, the duct 4 may also be configured in a closed annular manner, that is to say without a corresponding interruption. By way of example, the duct 4 may be configured or located in a manner which extends rotationally symmetrically, annularly about the axis A, in particular in a circular manner. The duct 4 may be configured such that over its entire length it penetrates a plane E which is preferably oriented in a normal manner to the axis A.

The duct 4 is formed by forming or deforming, in particular by plastic forming or deforming.

The workpiece 2 furthermore has a form-fitting connection 6 by which, when viewed in a cross section extending through the axis A, thus, for example, corresponding to the illustration of FIG. 1, the duct 4 is closed. The form-fitting connection 6 enables particularly simple manufacturing of the duct 4 and thus of the workpiece 2. In manufacturing, the duct 4 is thus closed by local plastic formation or deformation. Closing here may be, in particular, an irreversible closing.

Figure 2:
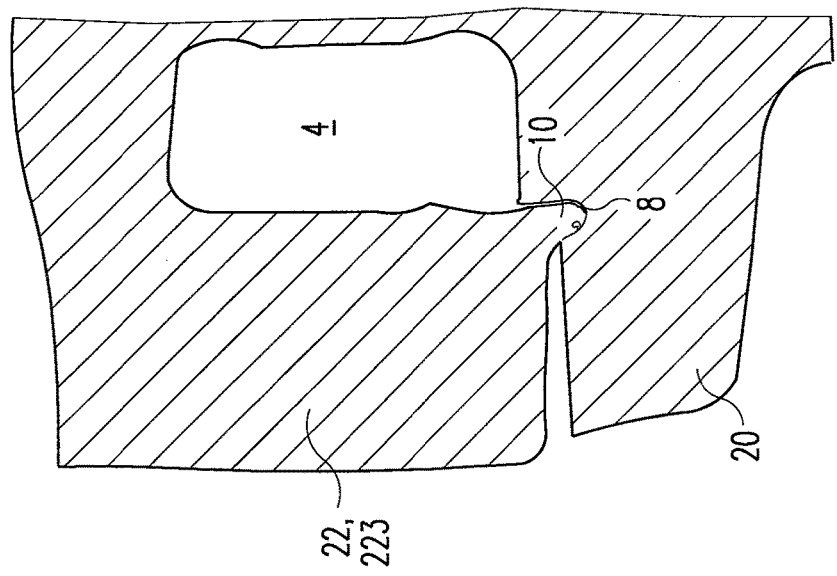
FIG. 2 shows an enlarged detail from FIG. 1 in the region of the form-fitting connection.

As can be seen in an exemplary manner more clearly from FIGS. 2 and 3, the form-fitting connection 6 preferably comprises elements of the form-fitting connection 6, in particular in the form of a groove 8 and a latching element 10 which engages in the groove 8. In other words, the workpiece 2 may have a latching element 10 which ensures an irreversible closing of the duct 4 by local plastic deformation.

This configuration is advantageous in relation to particularly simple manufacturing of the workpiece. The latching element 10 may be, for example, an elongated preliminary curvature or a pin-like element. A plurality of latching elements which engage in the groove 8 may also be provided.

Preferably, the groove 8 here is configured in an annular, in particular closed annular, manner and extending about the axis A. Furthermore preferably, the latching element 10 is configured in an annular, in particular closed annular, manner and extending about the axis A. In the event that the elements of the form-fitting connection 6, or the groove 8 and the latching element 10, are in each case configured in a closed annular manner, the duct 4 can be particularly easily designed to be tight.

For example, the workpiece 2—when viewed in the mentioned cross section—may have a first duct wall region 20 and a second duct wall region 22, which in each case are formed proceeding from a trunk region 24 of the workpiece 2 such that—when viewed in the mentioned cross section— an annular structure, which delimits the duct 4, is formed by the two duct wall regions 20, 22, or by the two duct wall regions 20, 22 and the trunk region 24, wherein the groove 8 is located in the first duct wall region 20 and the latching element 10 is located in the second duct wall region 22, or the groove 8 is located in the second duct wall region 22 and the latching element 10 is located in the first duct wall region 20.

As is the case in the exemplary embodiment shown, the first duct wall region 20 in relation to the axis A may be formed, proceeding from the trunk region 24 of the workpiece 2, protruding in a radial direction, and specifically preferably in a radially symmetrical manner in relation to the axis A. The second duct wall region 22 may have a radial portion 221 and also an end portion 223 adjoining the latter via a first bend 31. Between the radial portion 221 and the trunk region 24, a further portion 225 of the second duct wall region 22 may be configured, the radial portion 221 and the further portion 225 being connected to one another via a second bend 32. Here, the groove 8 may be formed on the first duct wall region 20, and the latching element 6 may be formed on the end portion 223 of the second duct wall region 22. Alternatively, the groove 8 may be formed on the end portion 223 of the second duct wall region 22, and the latching element 6 may be formed on the first duct wall region 20. The second duct wall region 22 may also be configured in a radially symmetrical manner in relation to the axis A; in this manner, the duct 4 can be formed extending about the axis A in an altogether radially symmetrical manner.

As is evident in an exemplary manner from FIG. 1, the first duct wall region 20 may form an external area region 40 of the workpiece 2. The second duct wall region 22 may likewise form an external area region or a further external area region 42 of the workpiece 2.

As is indicated in an exemplary manner (and only for the sake of clarity not in the left but only in the right region of the figure) in FIG. 1, the workpiece 2 may be configured such that—when viewed in the mentioned cross section— the elements of the form-fitting connection 6, or the groove 8 and the latching element 10, have a maximum extent EF which is smaller than the diameter D of the duct 4; "diameter" here refers to the maximum extent of the structure. For example, the extent EF may be smaller than a third, preferably smaller than a fifth, of the diameter D.

The first duct wall region 20 may have—when viewed in the mentioned cross section—a thickness or transverse extent S1 which is approximately of the same magnitude as the diameter D of the duct 4, for example between one tenth and the tenfold, preferably between one fifth and the fivefold, of the diameter D of the duct 4. The same applies to the thickness or transverse extent S2 of the second duct wall region 22.

In the manufacturing of the workpiece 2, it may be provided that during forming, by which the duct 4 is or is being formed, the first bend 31 and the second bend 32 are created, such that a "folding back", as it were, of the second region 22 takes place. The forming may be cold forming. The forming may comprise compressing or consist of compressing.

Particularly simple manufacturing is enabled in the event that interlocking elements of the form-fitting connection 6, that is to say, for example, the groove 8 and/or the latching element 10, are pre-formed. It may, in particular, thus be provided that the groove 8 and/or the latching element 10 are formed in a method step prior to the duct 4 being formed by forming, for example prior to the second region 22 being folded back for forming the duct 4.

The form-fitting connection 6 is preferably designed such that, to close the form-fitting connection 6 or the duct 4, the latching element 10 can be meshed with the groove 10 by "snapping" or "latching". On account of this, tightness of the duct 4 is particularly easily achievable.

The illustrated method is suited to a component having a corresponding cavity or a corresponding duct. The "snapping", that is to say the form-fitting connection, results from the plastic deformation or formation in the manufacturing of the workpiece.

The invention claimed is:

1. Integral workpiece, comprising
   a duct for a cooling medium located within a region which extends about an axis of the workpiece, wherein the duct is formed by forming and characterized by a form-fitting connection by which, when viewed in a cross section extending through the axis, the duct is closed, wherein:
   the form-fitting connection comprises a groove and a latching element which engages in the groove,
   the workpiece when viewed in a cross section has a first duct wall region and a second duct wall region, which in each case is formed proceeding from a trunk region of the workpiece such that when viewed in the cross section an annular structure, which delimits the duct, is formed by the two duct wall regions or by the two duct wall regions and the trunk region, and the groove is located in the first duct wall region and the latching element is located in the second duct wall region, or the groove is located in the second duct wall region and the latching element is located in the first duct wall region, wherein the first duct wall region in relation to the axis is formed, proceeding from the trunk region of the workpiece, protruding in a radial direction.

2. Integral workpiece according to claim 1, wherein at least one of the groove and the latching element is configured extending about the axis in an annular manner.

3. Integral workpiece according to claim 2, wherein at least one of the groove and the latching element is configured extending about the axis in a closed annular manner.

4. Integral workpiece according to claim 1, wherein at least one of the groove and/or and the latching element is pre-formed.

5. Integral workpiece according to claim 1, wherein the duct extends about the axis in an annular manner.

6. Integral workpiece according to claim 5, wherein the duct extends about the axis in a closed annular manner.

7. Integral workpiece according to claim 1, wherein the duct is formed by cold forming.

8. Integral workpiece according to claim 7, wherein the duct is formed by compressing.

9. Integral workpiece according to claim 1, comprising steel or aluminum.

10. Integral workpiece of claim 1 wherein the region extends in an annular manner about the axis of the workpiece.

11. Method for manufacturing an integral workpiece which has a duct for a cooling medium located within a region which extends about an axis of the workpiece, comprising forming the duct by forming, wherein in the context of forming the duct, when viewed in a cross section extending through the axis, the duct is closed by a form-fitting connection formed by forming a groove and a latching element and establishing the form-fitting connection by latching the latching element in the groove, wherein:

the workpiece when viewed in a cross section has a first duct wall region and a second duct wall region, which in each case is formed proceeding from a trunk region of the workpiece such that when viewed in the cross section an annular structure, which delimits the duct, is formed by the two duct wall regions or by the two duct wall regions and the trunk region, and, the groove is located in the first duct wall region and the latching element is located in the second duct wall region, or the groove is located in the second duct wall region and the latching element is located in the first duct wall region, wherein the first duct wall region in relation to the axis is formed, proceeding from the trunk region of the workpiece, protruding in a radial direction.

12. Method according to claim 11, wherein the forming comprises compressing.

13. Method according to claim 11, wherein the forming is cold forming.

14. Method for manufacturing an integral workpiece according to claim 11, wherein the region extends in an annular manner about the axis of the workpiece.

* * * * *